(12) United States Patent
Goodwin et al.

(10) Patent No.: US 9,359,808 B2
(45) Date of Patent: Jun. 7, 2016

(54) TRIPLE-GLAZED INSULATING UNIT WITH IMPROVED EDGE INSULATION

(71) Applicant: PPG INDUSTRIES OHIO, INC., Cleveland, OH (US)

(72) Inventors: George B. Goodwin, Cranberry Township, PA (US); Michael J. Buchanan, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 891 days.

(21) Appl. No.: 13/623,915

(22) Filed: Sep. 21, 2012

(65) Prior Publication Data

US 2014/0087098 A1    Mar. 27, 2014

(51) Int. Cl.
| | | |
|---|---|---|
| E06B 3/663 | (2006.01) | |
| E06B 3/66 | (2006.01) | |
| E06B 3/673 | (2006.01) | |

(52) U.S. Cl.
CPC ........... *E06B 3/6617* (2013.01); *E06B 3/67326* (2013.01); *E06B 3/663* (2013.01); *E06B 3/66366* (2013.01); *Y02B 80/22* (2013.01)

(58) Field of Classification Search
CPC ............ E06B 3/67326; E06B 3/66366; B32B 17/10055; Y02B 80/22; Y02B 80/24
See application file for complete search history.

(56) References Cited

U.S. PATENT DOCUMENTS

| | | |
|---|---|---|
| 3,971,178 A | 7/1976 | Mazzoni et al. |
| 4,109,431 A | 8/1978 | Mazzoni et al. |
| 4,134,240 A | 1/1979 | Bologna et al. |
| 4,431,691 A | 2/1984 | Greenlee |
| 4,610,711 A | 9/1986 | Matesa et al. |
| 4,792,536 A | 12/1988 | Pecoraro et al. |
| 4,806,220 A | 2/1989 | Finley |
| 4,807,419 A | 2/1989 | Hodek et al. |
| 4,831,799 A | 5/1989 | Glover et al. |
| 4,853,257 A | 8/1989 | Henery |
| 4,873,206 A | 10/1989 | Jones |
| 4,873,803 A | 10/1989 | Rundo |
| 5,030,593 A | 7/1991 | Heithoff |

(Continued)

FOREIGN PATENT DOCUMENTS

| | | |
|---|---|---|
| DE | 12 12 274 B | 3/1966 |
| EA | 200700553 A1 | 10/2007 |

(Continued)

OTHER PUBLICATIONS

PCT Search Report, PCT/US2013/050185, dated Nov. 20, 2013.

(Continued)

*Primary Examiner* — Donald J Loney
(74) *Attorney, Agent, or Firm* — Andrew C. Siminerio (57) ABSTRACT

An insulating unit includes a first spacer frame between first and second sheets, e.g. glass sheets, and a second spacer frame between the second sheet and a third sheet. A first surface of the first spacer frame is adhered to inner surface of the first sheet, and an opposite second surface of the first spacer frame is adhered to a first surface of the second sheet, by a moisture impervious adhesive layer. A first outer surface of the second spacer frame is adhered to a second surface of the second sheet, and an opposite second outer surface of the second spacer frame is adhered to an inner surface of the third sheet, by the adhesive layer. The first spacer frame and the second spacer frame have an offset of greater than zero.

16 Claims, 7 Drawing Sheets

(56) References Cited

U.S. PATENT DOCUMENTS

| | | |
|---|---|---|
| 5,295,292 A | 3/1994 | Leopold |
| 5,361,476 A | 11/1994 | Leopold |
| 5,531,047 A | 7/1996 | Leopold et al. |
| 5,655,282 A | 8/1997 | Hodek et al. |
| 5,678,377 A | 10/1997 | Leopold |
| 6,811,884 B2 | 11/2004 | Goodwin et al. |
| 7,422,650 B2 | 9/2008 | McGlinchy |
| 7,455,912 B2 | 11/2008 | Walters et al. |
| 2009/0324858 A1* | 12/2009 | Jaeger .................. E06B 3/6612 428/34 |
| 2012/0047708 A1 | 3/2012 | Briese et al. |

FOREIGN PATENT DOCUMENTS

| | | |
|---|---|---|
| FR | 74 440 E | 12/1960 |
| WO | 2006/027146 A1 | 3/2006 |

OTHER PUBLICATIONS espacenet English abstract of EA010322 B2 which is equivalent to EA 200700553 A1.

* cited by examiner

TRIPLE-GLAZED INSULATING UNIT WITH IMPROVED EDGE INSULATION

NOTICE OF GOVERNMENT SUPPORT

This invention was made with Government support under Cooperative Agreement No. DE-EE-0000167 awarded by the Department of Energy. The United States government may have certain rights in this invention.

BACKGROUND OF THE INVENTION

1. Field of the Invention

This invention relates to a glazed insulating unit with improved edge insulation, the unit having three or more spaced sheets, and more particularly, to a triple-glazed insulating unit having adjacent sheets separated by a spacer frame wherein the spacer frames are offset from one another.

2. Presently Practiced Technology

At the present time the majority of insulating glazing units includes a pair of glass sheets separated by a spacer frame. In general and not limiting to the discussion, the units having metal spacer frames, e.g. of the type shown in FIGS. 1, 3, 4 and 10 of U.S. Pat. No. 5,655,282 are fabricated by applying a moisture impervious adhesive or sealant on outer opposed surfaces of a metal spacer frame and positioning the spacer frame between a pair of sheets to form a subassembly. The subassembly is conveyed though a heated oven to heat the adhesive after which the subassembly passes between pressing rolls to press the sheets against the spacer frame to flow the adhesive to form a moisture impervious seal having a predetermined thickness between the outer surfaces of the spacer frame and the adjacent inner marginal edge portions of the sheets. Although this procedure is acceptable for making insulating units having two glass sheets and a single spacer frame, there are limitations when the process and equipment is used to make insulating units having three or more glass sheets and two or more spacer frames.

More particularly, in the process of making a triple glazed insulating unit, a first spacer frame having a layer of a moisture impervious adhesive or sealant on opposed outer surfaces of the spacer frame is positioned between a first sheet and a first surface of a second sheet, and a second spacer frame having a layer of moisture impervious adhesive or sealant on opposed outer surfaces is positioned between a second surface of the second sheet (the second surface opposite to the first surface of the second sheet) and a third sheet to provide a subassembly. The subassembly of the triple glazed unit is conveyed though a heated oven between upper and lower heating elements to heat the adhesive to make it malleable after which the triple glazed subassembly passes between pressing rolls to bias the sheets toward one another against the spacer frames to form a moisture impervious seal having a desired thickness between the spacer frames and the inner marginal edge portions of the adjacent sheets.

The drawback with this process is that the adhesive or sealant layer between the first surface of the second sheet and the outer surface of the first spacer frame (hereinafter also referred to as the "first inner adhesive layer") and the adhesive or sealant layer between the outer surface of the second spacer frame and second surface of the second sheet (hereinafter also referred to as the "second inner adhesive layer") are at a lower temperature than the adhesive or sealant layer between the outer surface of the first spacer frame and the first sheet (hereinafter also referred to as the "first outer adhesive layer") and the adhesive or sealant layer between the outer surface of the second spacer frame and the third sheet (hereinafter also referred to as the "second outer adhesive layer"). A reason for the first and second inner adhesive layers being at a lower temperature than the first and the second outer adhesive layers is that the heat has to pass through the first and the second spacer frames before the first and the second inner adhesive layers are heated.

Based on the above discussion, it can be appreciated that maintaining the temperature of the heating oven and other process parameters to maintain the temperature of the first and the second inner adhesive layers in an acceptable temperature range might over heat the first and the second outer adhesive layers. When the subassembly passes through the pressing rolls, the first and the second inner adhesive layers are pressed to the desired thickness range; however, the first and the second outer adhesive layers are more malleable due to higher temperature and one or both of the outer adhesive layers are pressed to a thickness outside of the lower limit of the desired thickness range or otherwise have a thickness outside of the lower limit of the desired thickness range due to the weight of the subassembly. Further, maintaining the temperature of the heating oven and other process parameters to maintain the temperature of the first and the second outer adhesive layers in an acceptable temperature range might under heat the first and the second inner adhesive layers. When the subassembly passes through the pressing rolls, the first and the second outer adhesive layers are pressed to the desired thickness range; however, the first and the second inner adhesive layers are less malleable due to lower temperature and are pressed to a thickness outside of the desired thickness range or might not develop the desired level of adhesion.

As can be appreciated by those skilled in the art, it would be desirable to provide an insulating unit, and method of making an insulating unit, having two or more spacer frames and three or more glass sheets that does not have the drawbacks of the presently available insulating units, and method of making insulating units, having two or more spacer frames and three or more glass sheets.

SUMMARY OF THE INVENTION

The invention relates to an insulating unit. In one non-limiting embodiment of the invention, the insulating unit includes, among other things, a first spacer frame between a first and a second sheet, wherein a first outer surface of the first spacer frame is adhered to inner surface of the first sheet and an opposite second outer surface of the first spacer frame is adhered to a first major surface of the second sheet; a second spacer frame between the second sheet and a third sheet, wherein a first outer surface of the second spacer frame is adhered to a second major surface of the second sheet and an opposite second outer surface of the second spacer frame is adhered to an inner surface of the third sheet, wherein the second major surface of the second sheet is opposite to the first major surface of the second sheet, and a segment of the first spacer frame aligned with a segment of the second spacer frame, and the segment of the first spacer frame and the segment of the second spacer frame have an offset of greater than zero.

In another non-limiting embodiment of the invention, the marginal end portions of the insulating unit are mounted in a sash frame having a first groove and an adjacent second groove. The base of the first groove is deeper than the base of the second groove, and marginal end portions of the first and the second sheets are mounted in the first groove and peripheral edges of the first and the second sheets engage the base of the first groove, and the marginal edge portion of the third sheet is mounted in the second groove and the peripheral edge of the third sheet engages the base of the second groove.

The invention further relates to a method of making an insulating unit. In one non-limiting embodiment of the invention, the method includes, among other things, making a subassembly including, among other things, a first spacer frame between a first and a second sheet, wherein a first outer surface of the first spacer frame is adhered to inner surface of the first sheet by an adhesive and an opposite second outer surface of the first spacer frame is adhered to a first major surface of the second sheet by an adhesive; a second spacer frame between the second sheet and a third sheet, wherein a first outer surface of the second spacer frame is adhered to a second major surface of the second sheet by an adhesive and opposite second outer surface of the second spacer frame is adhered to an inner surface of the third sheet by an adhesive, wherein the second major surface of the second sheet is opposite to the first major surface of the second sheet, and a segment of the first spacer frame is aligned with a segment of the second spacer frame, and the segment of the first spacer frame and the segment of the second spacer frame have an offset of greater than zero. The subassembly is heated, and the first sheet and third sheet are biased toward one another to flow the adhesive.

DETAILED DESCRIPTION OF THE INVENTION

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired property sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, when used herein, the terms "mounted over", "positioned over", or "provided over" mean mounted, positioned, or provided on but not necessarily in surface contact with. For example, one article or component of an article "provided over" another article does not preclude the presence of materials between the articles, or between components of the article, respectively.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

Figure 1:
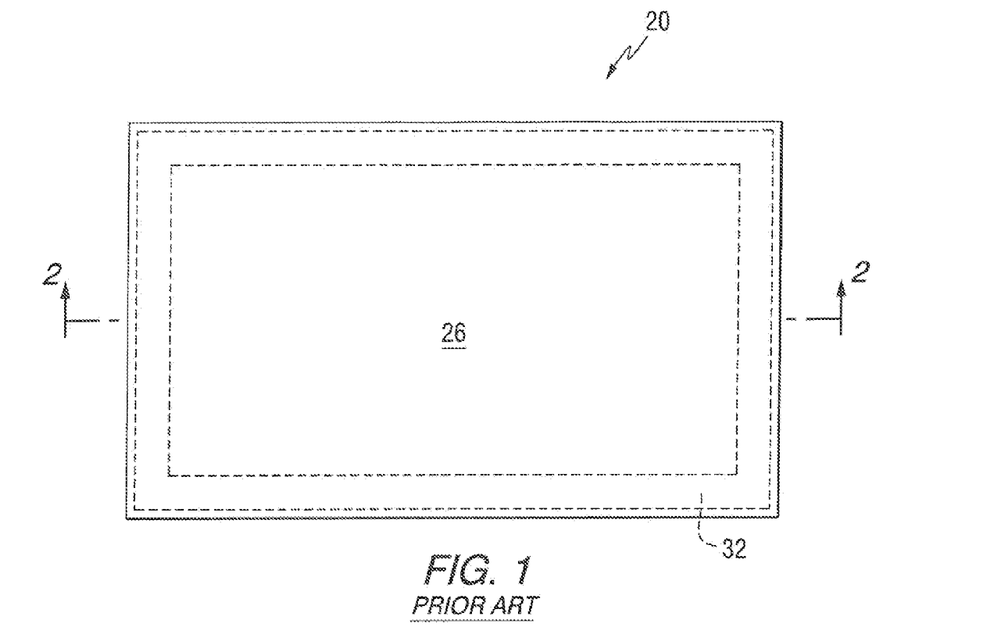
FIG. 1 is an elevated plan view of a triple glazed insulating unit of the prior art.
Figure 2:
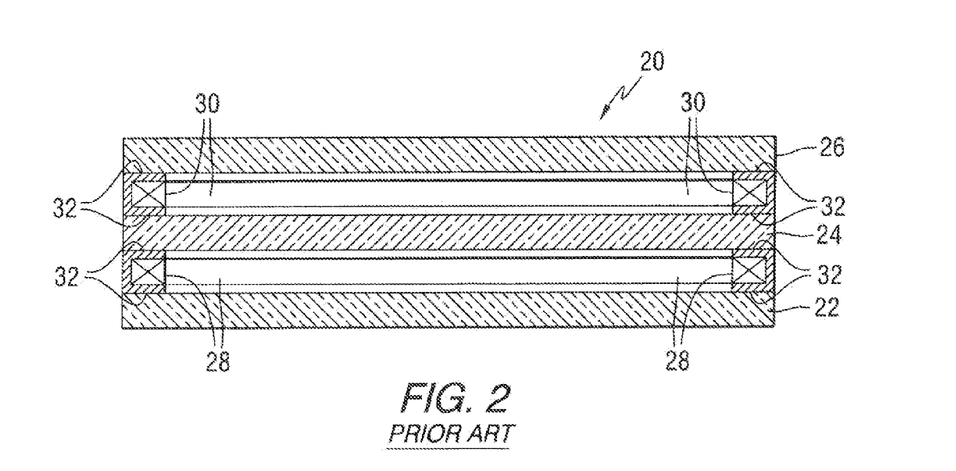
FIG. 2 is a view taken along line 2-2 of FIG. 1.

With reference to FIGS. 1 and 2 there is shown a prior art triple glazed insulating unit 20. The prior art unit 20 as shown in FIG. 2 has a generic spacer in that the spacer design is not defined and can be any of the designs known in the art. The unit 20 includes three sheets 22, 24, 26 and two spacer frames 28, 30 (see FIG. 2) arranged to have the spacer frame 28 between the sheets 22 and 24, and the spacer frame 30 between the sheets 24 and 26. The spacer frames 28 and 30 are secured to their respective sheets 22, 24, and 24, 26, by a layer 32 of an adhesive or sealant, preferably a moisture impervious adhesive or sealant.

In the following discussion the sheets 22, 24 and 26 are referred to as glass sheets; however, as will become apparent, the materials of the sheets 22, 24 and 26 are not limited to glass and can be made of any material, e.g. but not limited to soda-lime-silica glass, lithium aluminosilicate glass, crown glass, and/or borosilicate glass and any one or all of the sheets can be made of any similar or dissimilar material e.g. plastic, metal or wood, and the sheet can be a monolithic sheet or a laminate made of the mentioned materials. Further, one or more of the sheets 22, 24 and 26 can be coated e.g. glass or plastic transparent sheets can have an opaque coating of the type used in making spandrels. Still further, one or more of the glass or plastic transparent sheets can have an environmental coating on one or more of the sheet surfaces to selectively pass or reflect predetermined wavelength ranges of light. Further, the coatings on outer surfaces of the sheets can be self cleaning coatings or water repellent coatings. More particularly, glass sheets can have coatings to filter portions of the infrared range e.g. low emissivity coatings and/or coatings to reflect light e.g. reflective coatings. Although not limiting to the invention, coatings disclosed in U.S. Pat. Nos. 4,610,711; 4,806,220; 4,853,257; 6,811,884 and 7,455,912, which patents in their entirety are hereby incorporated by reference can be used in the practice of the invention. Still further, one or more of the glass sheets 22, 24 and 26 can be coated and/or uncoated colored sheets. Although not limiting to the invention, colored sheets of the type disclosed in U.S. Pat. Nos. 4,873,206; 5,030,593 and 4,792,536 which patents in their entirety are hereby incorporated by reference can be used in the practice of the invention.

Figure 3:
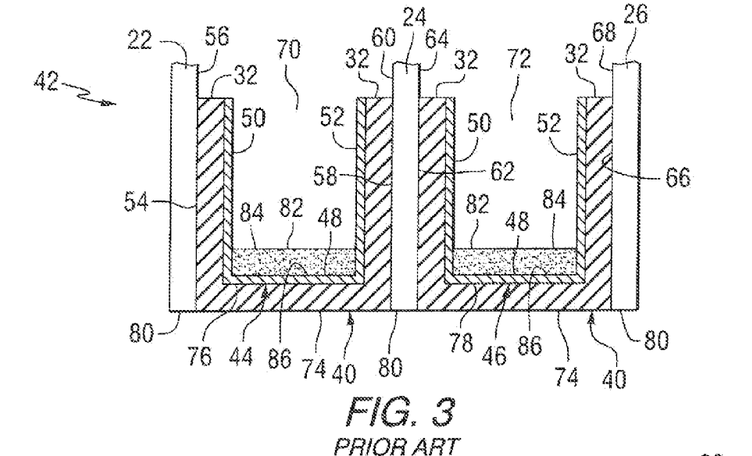
FIG. 3 is a sectional view of an edge assembly of a triple glazed unit of the prior art.

Shown in FIG. 3 is a prior art edge assembly 40 of a triple glazed unit 42 discussed in detail in U.S. Pat. No. 5,655,282, which patent in its entirety is hereby incorporated by reference. The edge assembly 40 includes spacer frames 44 and 46, and glass sheets 22, 24 and 26. Each of the spacer frames 44 and 46 have a U-shaped cross section including a base member 48 connecting two leg members 50 and 52. The leg member 50 of the spacer frame 44 is secured to marginal edge portions 54 of inner surface 56 of the sheet 22 by the adhesive or sealant layer 32, and the leg member 52 of the spacer frame 44 is secured to marginal edge portions 58 of surface 60 of the sheet 24 by the adhesive or sealant layer 32. The upright leg member 50 of the spacer frame 46 is secured to marginal edge portions 62 of surface 64 of the sheet 24 by the adhesive or sealant layer 32. As shown in FIG. 3 the surface 60 of the sheet 24 is opposite to the surface 64 of the sheet 24. The leg member 52 of the spacer frame 46 is secured to marginal edge portions 66 of inner surface 68 of the sheet 26 by the adhesive or sealant layer 32.

The spacer frame 44 and the adhesive layers 32 between the legs 50 and 52 of the spacer frame 44 and the glass sheets 22 and 24, respectively provide a dead air space or compartment 70 between the sheets 22 and 24, and the spacer frame 46 and the adhesive layers 32 between the legs 50 and 52 of the spacer frame 46 and the glass sheets 24 and 26, respectively provide a dead air space or compartment 72 between the sheets 24 and 26. In the preferred practice of the invention, the adhesive or sealant layers 32 act as a barrier to moisture entering the compartments 70 and 72 and/or a barrier to gas, e.g., insulating gas such as argon or kryptonite from exiting the compartments 70 and 72. With respect to the loss of the fill gas from the unit, in practice the length of the diffusion path and thickness of the sealant layer 32 are chosen in combination with the gas permeability of sealant material so that the rate of loss of the fill gas matches the desired unit performance lifetime. The ability of the unit to contain the fill gas can be measured using a European procedure identified as DIN 52293. The rate of loss of the fill gas is not limiting to the invention and can be any value, e.g. but not limited to less than 5% per year. Further, the adhesive or sealant layer 32 to be used with the spacer frames 44 and 46 can have any moisture permeability, e.g. but not limited to a moisture permeability of less than 20 gm mm/M2 day using ASTM F 372-73. For a detailed discussion regarding the ingress of moisture into the compartments 70 and 72, and the egress of fill gas out of the compartments, reference can be made to U.S. Pat. No. 5,655, 282.

With continued reference to FIG. 3, an additional adhesive or sealant type layer 74, e.g. but not limited to silicone adhesive and/or a hot melt can be provided in perimeter grooves 76 and 78 of the unit 42. The perimeter groove 76 is formed by the base member or middle leg 48 of the spacer frame 44 and the marginal edge portions 54 and 58 of the sheets 22 and 24, respectively, and the perimeter groove 78 is formed by the base member or middle leg 48 of the spacer frame 46 and marginal edge portions 62 and 66 of the sheets 24 and 26, respectively. As can now be appreciated the sealant layer 74 is not limiting to the invention and can be any of the types known in the art e.g. of the type disclosed in U.S. Pat. No. 4,109,431, which patent in its entirety is hereby incorporated by reference. Further, in another non-limiting embodiment of the prior art the base member or middle leg 48 of the spacer frame 44 is level with peripheral edges 80 of the sheets 22 and 24, and optionally the base member or middle leg 48 of the spacer frame 46 is level with the peripheral edges 80 of the sheets 24 and 26.

As is appreciated by those skilled in the art, moisture captured in the compartments 70 and 72 of the unit 42 during manufacturing of the unit 42 is adsorbed by a desiccant 82 in a thin layer 84 of a moisture pervious adhesive. The moisture pervious adhesive layer 84 having the desiccant 82 is provided on inner surface 86 of the base member or middle leg 48 of the spacer frames 44 and 46 as shown in FIG. 3. The permeability of the layer 84 is not limiting to the invention but should be sufficiently permeable to moisture within its respective compartment 70 or 72 so that the desiccant 82 therein can adsorb moisture within its respective one of the compartments 70 and 72. Adhesive materials having a permeability of greater than 2 gm mm/M2 day as determined by the above referred to ASTM F 372-73 can be used in the practice of the invention.

In the non-limiting embodiment of the invention, the adhesive or sealant layers 32 and 74 are of the type sold by H. B. Fuller Catalog No. HL-5153. As can now be appreciated the invention is not limited to the type of adhesive or sealant used and any of the types of moisture and/or gas pervious or impervious adhesives or sealants used in the art can be used in the practice of the invention.

The prior art is discussed to make a triple glazed unit having a length of 30 inches and a width of 24 inches. The glass sheets 22, 24 and 26 each had a length of 30 inches, a width of 24 inches and a thickness of 0.125 inches. Two spacer frames 44 and 46 are formed in any convenient manner, e.g. as disclosed in U.S. Pat. Nos. 5,678,377; 5,361,476; 5,295,292; 4,831,799; 4,431,691 and 4,873,803, which patents in their entirety are hereby incorporated by reference. Each of the spacer frames 44 and 46 had a length of 29.75 inches, a width of 23.75 inches, a thickness of 0.469 inches as measured between the leg members 50 and 52 of the spacer frame, and a height of 0.30 inch as measured from the middle leg 48 of the spacer frame. The adhesive or sealant layer 32 had a thickness of 0.020 inches and the sealant layer 74 had a thickness of 0.040 inches.

Figure 4:
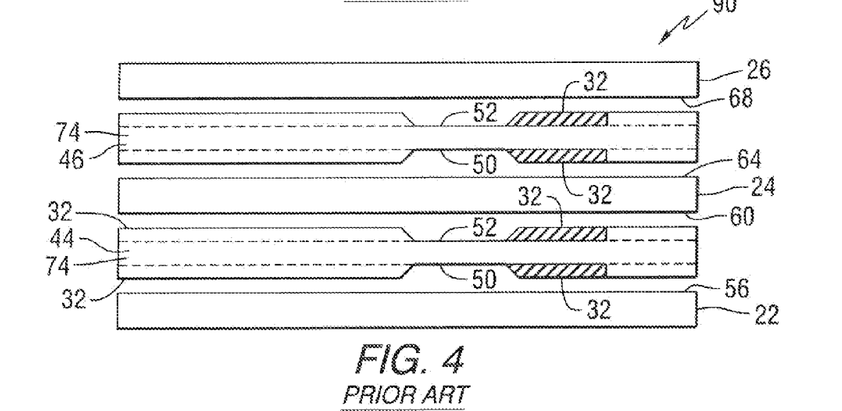
FIG. 4 is an elevated side view of a laid-up subassembly of the triple glazed unit of the prior art shown in FIG. 3, portion of the component of the subassembly are removed for purposes of clarity.
Figure 5:
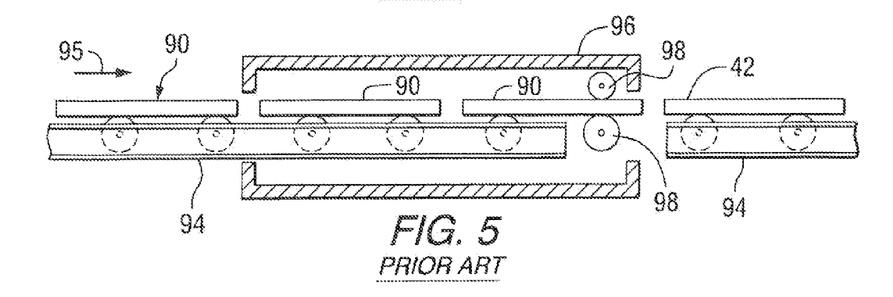
FIG. 5 is an elevated side view of an apparatus for heating the subassembly and pressing the heated subassembly to make the triple glazed unit of the prior art. Portions of the apparatus are shown in cross section for purposes of clarity.

With reference to FIGS. 4 and 5 as needed, a subassembly 90 of the unit 42 is assembled in any usual manner, e.g. but not limited to the following process. The glass sheet 22 is laid on a table (not shown) and the spacer frame 44 having the adhesive or sealant layers 32 and sealant layer 74 is placed on the surface 56 of the sheet 22 with the leg member 50 of the spacer frame 44 facing the surface 56 of the sheet 22. The surface 60 of the sheet 24 is placed over the leg member 52 of the spacer frame 44. The spacer frame 46 having the adhesive or sealant layer 32 and the sealant layer 74 is placed over the surface 64 of the sheet 24 with the leg member 50 of the spacer frame 46 facing the surface 64 of the sheet 24. The surface 68 of the sheet 26 is placed over the leg member 52 of the spacer frame 46 to provide the subassembly 90.

With reference to FIG. 5, the subassembly 90 of the triple glazed unit 42 is placed on a conveyor 94 and advanced by the conveyor 94 in the direction of arrow 95 into an oven 96 heated to a temperature of 700° F. The subassembly 90 is moved at a rate of 12 inches per minute through the oven 96 and between pinch rolls 98 to bias the glass sheets 22 and 26 toward one another against the spacer frames 44 and 46 to flow the adhesive or sealant layers 32 to make the triple glazed insulating unit 42. The oven is set at a temperature to heat the adhesive sealant layer 32 between the sheet 22 and the leg member 50 of the spacer frame 44, and the layer 32 between the sheet 26 and the leg member 52 of the spacer frame 46, and to heat the adhesive layers 32 between the leg member 52 of the spacer frame 44 and the sheet 24, and the leg 50 of the spacer frame 46 and the sheet 24, to a temperature in the temperature range specified by the manufacturer of the adhesive or sealant in which the adhesive or sealant is hot enough to develop the proper adhesion. As is appreciated by those skilled in the art, if the proper adhesion is not developed, the unit will most likely have longevity problems, e.g. premature seal failure.

Based on the process parameters, the difference between the temperature of the adhesive or sealant layer 32 between the sheet 22 and the leg member 50 of the spacer frame 44, and the adhesive or sealant layer 32 between the sheet 26 and the leg member 52 of the spacer frame 46, and the temperature of the adhesive or sealant layer 32 between the leg member 52 of the spacer frame 44 and the sheet 24, and the adhesive or sealant layer 32 between the leg 50 of the spacer frame 46 and the sheet 24, is believed to be in the range of 30-60° F. The temperature of the adhesive or sealant layer 32 between the sheet 22 and the leg member 50 of the spacer frame 44, and the adhesive or sealant layer 32 between the sheet 26 and the leg member 52 of the spacer frame 46 is hotter than the temperature of the adhesive or sealant layers 32 between the leg member 52 of the spacer frame 44 and the sheet 24, and the leg 50 of the spacer frame 46 and the sheet 24.

The adhesive or sealant layer 32 between the sheet 22 and the leg member 50 of the spacer frame 44, and the adhesive or sealant layer 32 between the sheet 26 and the leg member 52 of the spacer frame 46, has the desired thickness and sealing properties; whereas, the adhesive or sealant layers 32 between the leg 52 of the spacer frame 44 and the sheet 24, and the leg 50 of the spacer frame 46 and the sheet 24 may not have the desired thickness and sealing properties because the adhesive or sealant layers 32 on each side of the sheet 24 were heated to a lower temperature than the layer 32 between the sheet 22 and the leg member 50 of the spacer frame 44, and the layer 32 between the sheet 26 and the leg member 52 of the spacer frame 46. The adhesive or sealant layer 32 on each side of the sheet 24 is at a lower temperature because the path on one side of the subassembly 90 to reach the middle sheet 24 has to pass through the sheet 22, the layer 32 on the leg member 50 of the spacer frame 44, the base member or middle leg member 48 of the spacer frame 44, and the moisture pervious layer 84 of the spacer frame 44 having the desiccant 82 to reach the adhesive or sealant layer 32 between the leg 52 of the spacer frame 44 and the sheet 24, and the path on the other side of the subassembly 90 to reach the middle sheet 24 has to pass through the sheet 26, the layer 32 on the leg member 52 of the spacer frame 46, the base member or middle leg member 48 of the spacer frame 46, and the moisture pervious layer 84 of the spacer frame 46 having the desiccant 82 to reach the adhesive or sealant 32 between the leg member 50 of the spacer frame 46 and the sheet 24. As is appreciated by those skilled in the art, radiant heat needs a line of sight to an object in order to heat it directly. In this discussion there is no line of sight to the layers 32 on the middle sheet 24 because the radiant heat will not directly pass through the layers 32 on the sheets 22 and 26, and the legs 50 and 52 of the spacer frames 44 and 46 because these materials are opaque to radiant heat. The radiant heat will be absorbed by adhesive or sealant layers 32 and then conduct through the spacer frames to the adhesive or sealant layers 32 on the middle sheet 24. The radiant heating mechanisms as the subassembly 90 passes through the oven 96 are complex, and have been simplified in the above discussion for a better appreciation of the invention. The effect of heat loss passing through a spacer frame of an insulating unit is discussed in detail in U.S. Pat. No. 5,655,282.

Increasing the temperature of the oven 96 to make certain the adhesive or sealant layer 32 on each side of the sheet 24 is in the desired temperature range increases the temperature difference between the adhesive or sealant layer 32 on the inner sheet 24 and the adhesive or sealant layer 32 on the sheets 22 and 26 resulting in a viscosity difference, which results in the adhesive or sealant layer 32 on the sheets 22 and 26 to have a thickness below the desired thickness range. A drawback with having the adhesive or sealant layers 32 on the sheets 22 and 26 with thicknesses below 0.015 inch is that a good seal, e.g. a seal having the proper adhesion and thickness may not be formed. Therefore, the layer 32 has to be thick enough, e.g. greater than 0.015 inches and have the proper adhesion to ensure a good seal.

As can be appreciated, the invention is not limited by the equipment to fabricate the triple glazed unit 42, and the triple glazed unit of the invention discussed below, and any heating and pressing equipment can be used, e.g. but not limited to the equipment disclosed in U.S. Pat. No. 7,422,650 B2, which patent in its entirety is hereby incorporated by reference.

Figure 6:
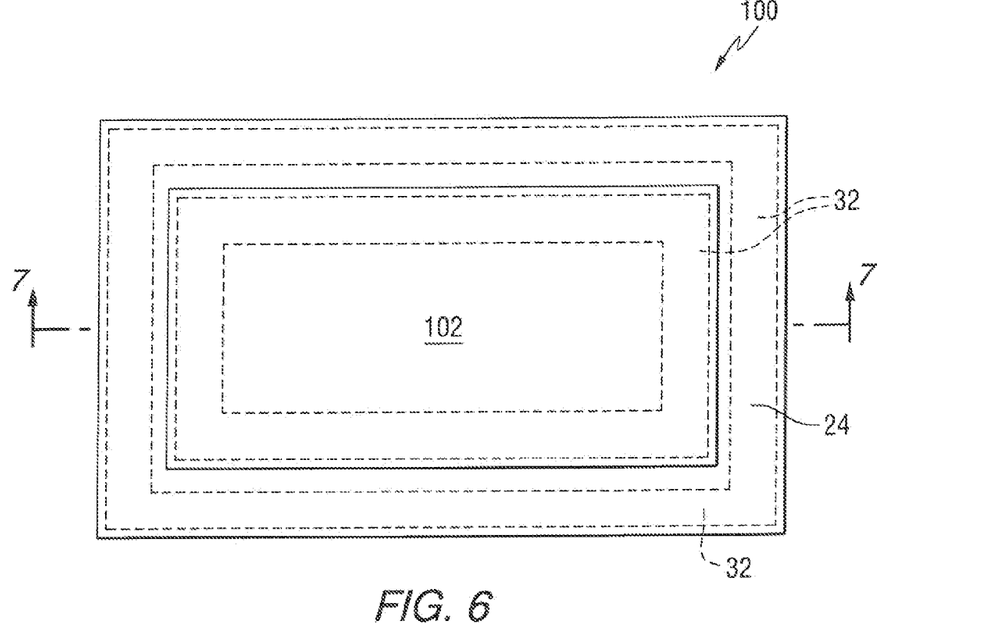
FIG. 6 is a view similar to the view of FIG. 1 showing a non-limiting embodiment of a triple glazed unit of the invention.
Figure 7:
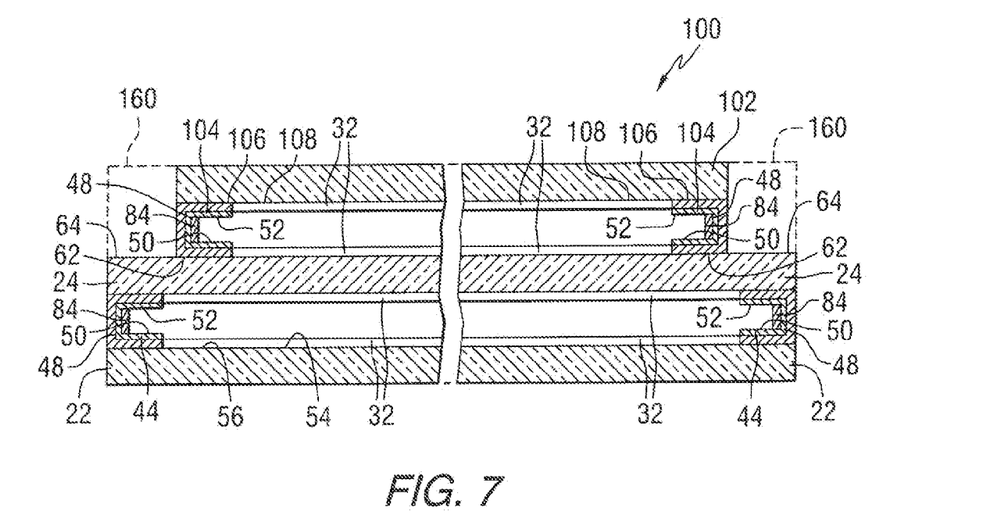
FIG. 7 is a view taken along line 7-7 of FIG. 6.

In the practice of the invention, the two spacer frames of a triple glazed unit are offset from one another to expose the adhesive or sealant layer 32 on each side of the sheet 24 to the heating elements of the oven. In one non-limiting embodiment of the invention, the offset is obtained by making one spacer frame smaller or larger then the other spacer frame, and in another non-limiting embodiment of the invention, the offset is obtained by positioning the spacer frames of the same size relative to one another in the manner discussed below. Consider now the non-limiting embodiment of the invention of offsetting the spacer frames from one another by making one spacer frame smaller or larger than the other spacer frame. With reference to FIGS. 6 and 7 as needed, there is shown a triple glazed unit 100 of the invention. The unit 100 includes the sheets 22 and 24, and a sheet 102. The spacer frame 44 is between the sheets 22 and 24, and spacer frame 104 is between the sheets 24 and 102. The leg members 50 and 52 of the spacer frame 44 are secured to the sheets 22 and 24 by the adhesive or sealant layer 32 as previously discussed (see FIG. 3). The leg member 50 of the spacer frame 104 is secured to the marginal edge portions 62 of the surface 64 of the sheet 24 by the adhesive or sealant layer 32, and the leg member 52 of the spacer frame 104 is secured to the marginal edge portions 106 of a surface 108 of the sheet 102. Each of the spacer frames 44 and 104 have the moisture pervious layer 84 having the desiccant 82 (the desiccant 82 clearly shown in FIG. 3).

The triple glazed unit 100 of the invention is manufactured by making a subassembly in a similar manner as the subassembly 90 shown in FIG. 4 except that the sheet 26 and the spacer frame 46 are replaced by sheet 102 and the spacer frame 104.

As shown in FIGS. 6 and 7, the spacer frames 44 and 104 are offset from one another by making the perimeter of one of the spacer frames, e.g. the spacer frame 104 smaller than the perimeter of the other spacer frame, e.g. the spacer frame 44. With this arrangement the spacer frames 44 and 104 do not overshadow one another such that the adhesive or sealant 32 of each of the spacer frames 44 and 104 are exposed in a similar manner to the heating elements of the oven, e.g. the oven 96 and are heated to a temperature in the same smaller temperature range than if the spacer frames completely overshadowed one another.

Figure 8:
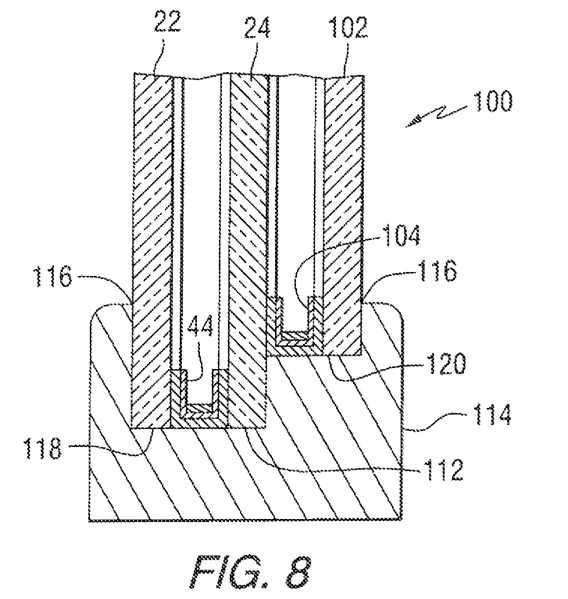
FIG. 8 is a cross sectional view of a window showing a non-limiting embodiment of a triple glazed unit of the invention mounted in a sash member.

Shown in FIG. 8 is a sectional view showing edge 112 of a non-limiting embodiment of the triple glazed unit 100 of the invention shown in FIGS. 6 and 7 mounted in a non-limited embodiment of a sash member 114 of the invention. The sash member 114 has a groove 116 having two depth levels 118 and 120. The deeper level 118 is sized to receive the edges of the larger glass sheets, e.g. the sheets 22 and 24, and the shallower level 120 is sized to receive the smaller spacer frame, e.g. the spacer frame 104 and the smaller sheet, e.g. the sheet 102. The sash member 114 can be made of any material, e.g. but not limited to wood, metal, plastic and combinations thereof.

Another benefit of the invention is that the offset of the spacer frames increases the thermal path through the edge of the unit. More particularly, the thermal path for the triple glazed unit 42 shown in FIG. 3 is a straight line from the sheet 22 through the spacer frame 44 through the glass sheet 24, through the spacer frame 46 and through the sheet 26. The thermal path for the triple glazed unit 100 of the invention as shown in FIG. 7 is not a straight line and extends from the sheet 22, through the spacer frame 44 to the sheet 24, along the sheet 24 to the spacer frame 104 and through the spacer frame 104 to the sheet 102. The increase in the length of the thermal path reduces the thermal energy transfer through the edge of the unit. For a more detailed discussion of the effect of increasing the length of the thermal path at the edge of an insulating unit, reference can be made to the discussion in U.S. Pat. No. 5,655,282.

Figure 9:
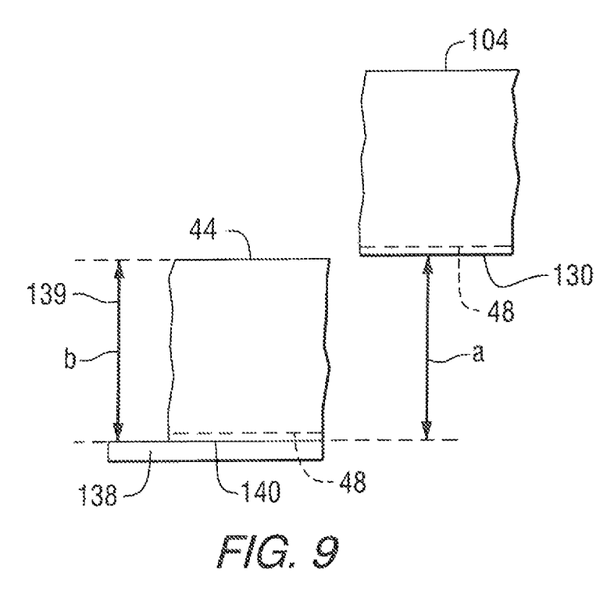
FIG. 9 is a sketch showing a procedure to determine offset of adjacent spacer frames in accordance to the teachings of the invention.
Figure 10:
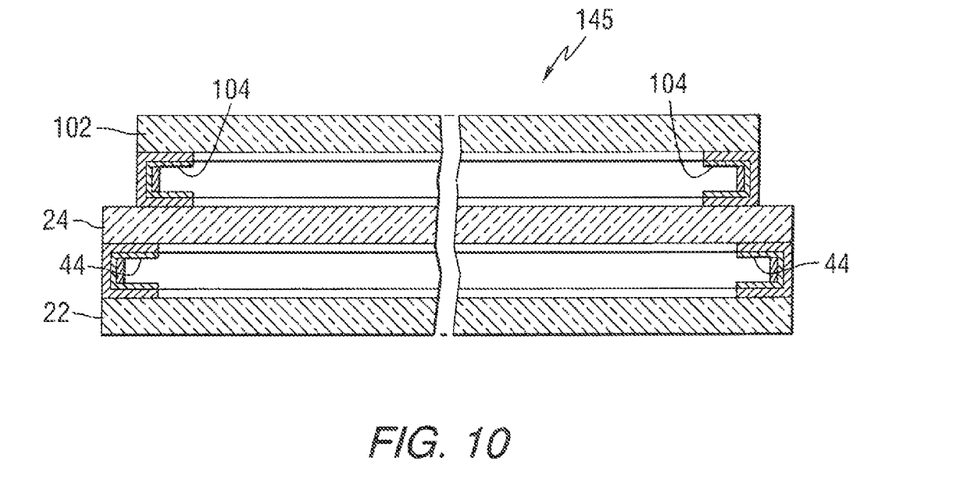
FIGS. 10 and 11 are views similar to the view of FIG. 4 showing non-limiting embodiments of the invention.

The invention is not limited to the amount of offset of the spacer frames 44 and 104. With reference to FIGS. 7 and 9 as needed, for purposes of clarity, the offset of the spacer frames is determined in the following manner. The offset for any given edge cross section of two adjacent spacer frames, e.g. but not limiting to the invention, the spacer frames 44 and 104 is equal to the distance "a" between outer surface 130 of the middle leg 48 of the inward spacer frame 104 and plane 138 divided by the height "b" of the outward spacer frame 44. The height "b" is measured along a straight line 139 normal to the plane 138 containing outer surface 140 of the middle leg 48 of the outward spacer frame 44. The distance "a" and the height "b" excludes the thickness of the adhesive layer 74 (see FIG. 3). Preferably the offset is greater than 0, e.g. greater than 2; more preferably in the range of 0.25 to 2, e.g. in the range of 0.50 to greater than 1, and more preferably in the range of greater than 1 to 1.5. The invention also contemplates offsets in the range of 1.20 to 1.5. In FIG. 7 the spacer frames 44 and 104 have an offset of greater than 1, e.g. about 1.5, and in FIG. 10, the spacer frames 44 and 104 of triple glazed unit 145 have an offset in the range of greater than zero to less than 1.

As can now be appreciated, when the triple glazed insulating unit does not include the layer 74 (see FIG. 3) an offset of 1 between the spacer frames 44 and 104 will be expected to completely expose the spacer frame 44 in a perpendicular plan view of the subassembly. However, when the triple glazed insulating unit includes the layer 74, an offset of 1 between the spacer frames 44 and 104 will not completely expose the spacer frame 44 because the layer 74 of the spacer frame 104 will extend over the leg member 52 of the spacer frame 44. Therefore, in the preferred practice of the invention when the smaller spacer frame includes the layer 74, e.g. having a thickness of 0.040 inch, and the spacer frame has a height of 0.30 inch the offset should be greater than 1, e.g. 1.2.

In one non-limiting embodiment of the invention, the triple glazed unit 100 (see FIGS. 6 and 7) includes the sheets 22 and 24 each having a length of 30 inches, a width of 24 inches and a thickness of 0.125 inches; the glass sheet 102 having a length of 29.4 inches, a width of 23.4 inches and a thickness of 0.125; a spacer frame 44 having a length of 29.75 inches a width of 23.75 inches; a height (the length of "b" in FIG. 9) of 0.30 inch, and a thickness of 0.469 inches; a spacer frame 104 having a length of 29.15 inches, a width of 23.15 inches; a height of 0.30 inch, and a thickness of 0.469 inches, and each of the spacer frames have the layer 74 having a thickness of 0.040 inch. The spacer frames 44 and 104 have a length offset of 1 (calculated as follows (29.75−29.15)/(0.30×2))=1) and a width offset of 1 (calculated as follows (23.75−23.15)/(0.30× 2)=1). The length difference and the width difference of the spacer frames 44 and 104 are divided by two because the offset is at each end of the length and at each end of the width of the spacer frames. In this non-limiting embodiment of the invention, a portion, if not all, of the thickness of the layer 74 overlays a portion of the spacer frame 44.

Figure 11:
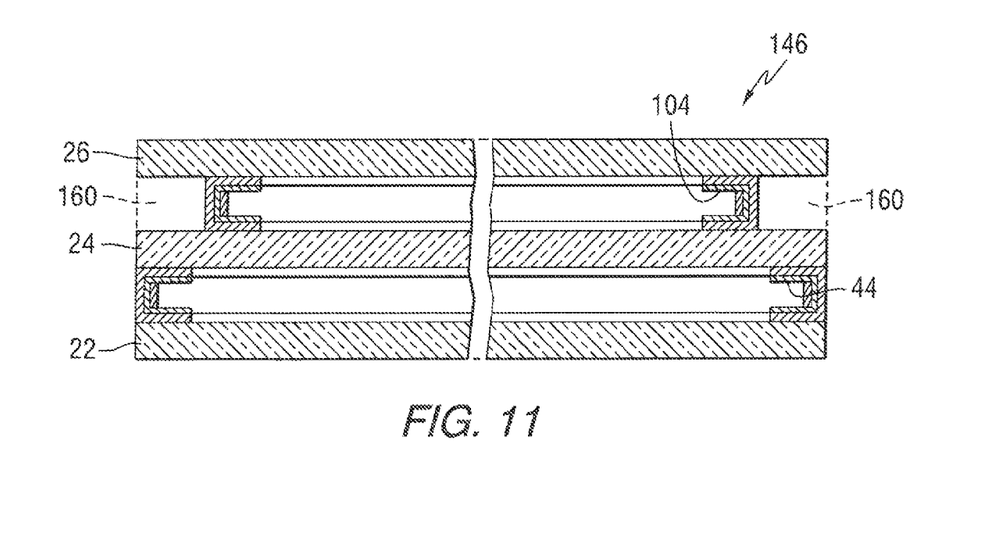

Shown in FIG. 11 is another non-limiting embodiment of a triple glazed unit of the invention designated by the number 146. The triple glazed unit 146 includes the glass sheets 22, 24 and 26, the spacer frame 44 between the sheets 22 and 24, and the spacer frame 104 between the sheets 24 and 26.

Figure 12:
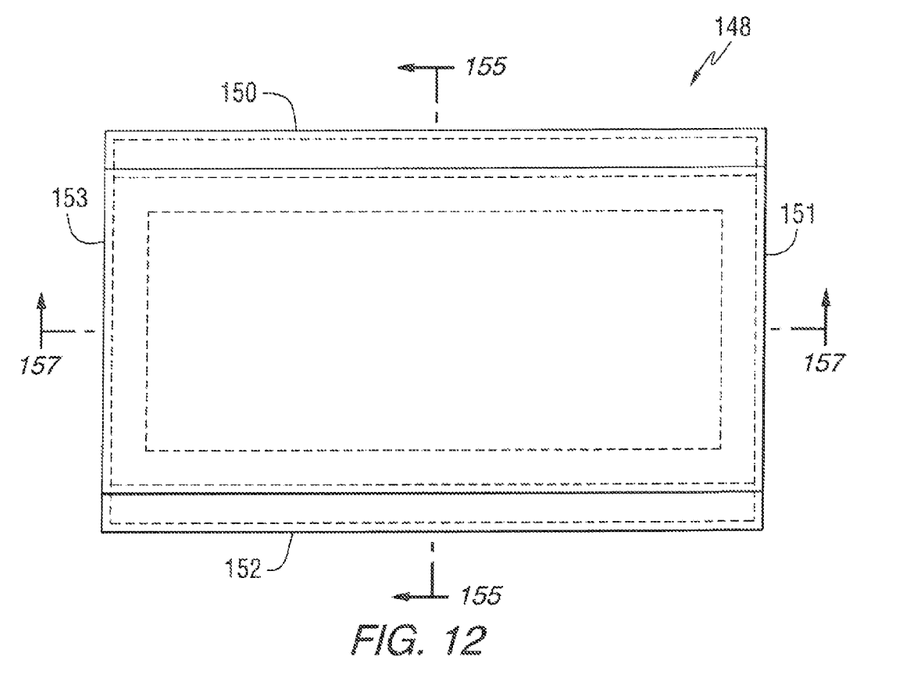
FIG. 12 is a view similar to the view of FIG. 6 showing another non-limiting embodiment of the invention.

Another non-limiting embodiment of the invention is shown in FIG. 12 and is designated by the number 148. Triple glazed insulating unit 148 shown in FIG. 12 has sides 150-153. The offset of the spacer frames of the unit 148 at the sides 150 and 152 is in the range of greater than 0 to 2, and the offset of the spacer frames of the unit 148 at the sides 151 and 153 is 0. The cross sectional view of the unit 148 along line 155 of the unit 148 in FIG. 12 is similar to the cross sectional view of the unit 100 shown in FIG. 7. The cross sectional view of the unit 148 along line 157 of the unit 148 in FIG. 12 is similar to the cross sectional view of the unit 20 shown in FIG. 2.

Optionally, an adhesive or sealant layer, or a spacer dehydrator member 160, e.g. but not limited to the type disclosed in U.S. Pat. No. 4,807,419 (shown in phantom in FIGS. 7 and 11) can be provided to fill the offset provided by the spacer frame 104 and the glass sheet 102 as shown in phantom in FIG. 7 and to fill the offset provided by the sheets 24 and 26 and the spacer frame 104 as shown in phantom in FIG. 11.

Figure 13:
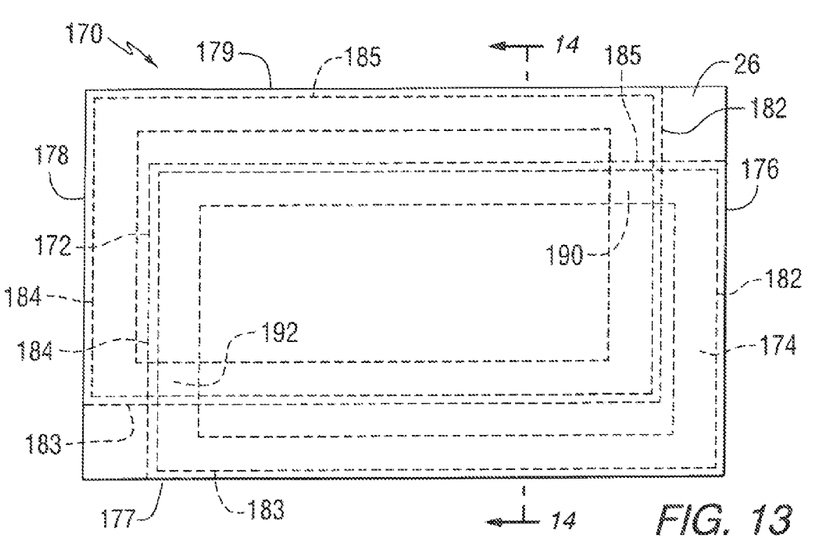
FIG. 13 is a view similar to the view of FIG. 6 showing another non-limiting embodiment of the invention.
Figure 14:
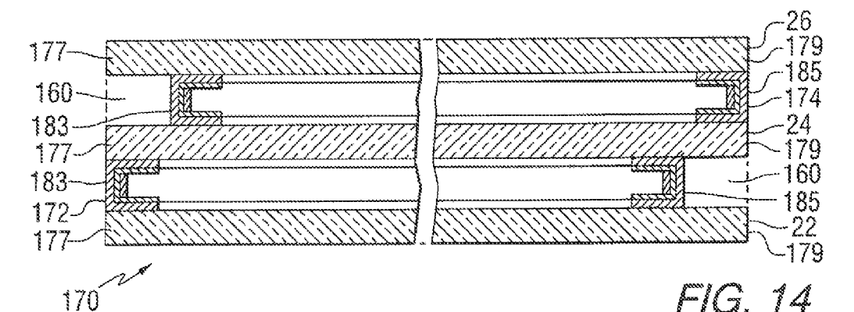
FIG. 14 is a view taken along line 14-14 of FIG. 13.

Consider now the non-limiting embodiment of the invention of offsetting the spacer frames of the same size relative to one another. In this embodiment of the invention, the spacer frames cross over one another and are offset from one another. More particularly and with reference to FIGS. 13 and 14 as needed, there is shown a multiple glazed unit of the invention designated by the number 170. The unit 170 includes the sheets 22, 24, and 26 separated by spacer frames 172 and 174 (clearly shown in FIG. 14). Each of the sheets in this non-limiting embodiment of the invention have four sides 176, 177, 178 and 179, and each of the spacer frames 172 and 174 have sides 182, 183, 184 and 185. The sides 176-179 of the sheets 22, 24 and 26 have the same length and width, and are sized to be larger than the spacer frames 172 and 174 such that the spacer frames 172 and 174 can be offset from one another as shown in FIG. 13. More particularly, the spacer frame 172 is between the sheets 22 and 24 (see FIG. 14), and the sides 182 and 183 of the spacer frame 172 are spaced from sides 176 and 177, respectively, of the sheets 22 and 24 a shorter distance than the sides 184 and 185 of the spacer frame 172 are spaced from the sides 178 and 179, respectively, of the sheets 22 and 24 as shown in FIG. 13. The spacer frame 174 is between the sheets 24 and 26 (see FIG. 14), and the sides 182 and 183 of the spacer frame 174 are spaced from the sides 176 and 177, respectively, of the sheets 24 and 26 a greater distance than the sides 184 and 185 of the spacer frame 174 are spaced from the sides 178 and 179, respectively, of the sheets 24 and 26 as shown in FIG. 13. As shown in FIG. 13 in this non-limiting embodiment of the invention the spacer frames 172 and 174 cross over and shadow one another at two positions identified by the numbers 190 and 192.

Figure 15:
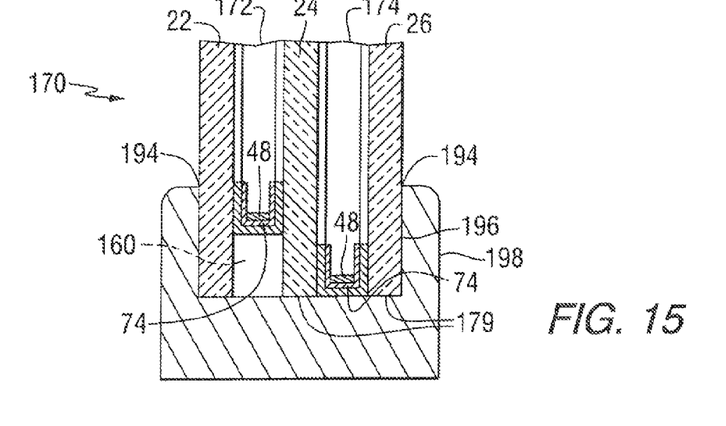
FIG. 15 is a cross sectional view of a window showing the unit shown in FIGS. 13 and 14.

In one non-limiting embodiment of the invention, the triple glazed unit 170 (see FIGS. 13 and 14) includes the sheets 22, 24 and 26 each having a length of 30 inches, a width of 24 inches and a thickness of 0.125 inches; the spacer frames 172 and 174 each having a length of 29.40 inches a width of 23.40 inches; a height (the length of "b" in FIG. 9) of 0.30 inch, and a thickness of 0.469 inches; and each of the spacer frames have the layer 74 having a thickness of 0.040 inch on the middle leg 48 of the spacer frames (shown in FIG. 15). With reference to FIG. 13, the distance between the middle leg 48 of the side 182 of the spacer frame 172 and the middle leg 48 of the side 182 of the spacer frame 174 is 0.34 inch; the distance between the middle leg 48 of the side 183 of the spacer frame 172 and the middle leg 48 of the side 183 of the spacer frame 174 is 0.34 inch; the distance between the middle leg 48 of the side 184 of the spacer frame 172 and the middle leg 48 of the side 184 of the spacer frame 174 is 0.34 inch, and the distance between the middle leg 48 of the side 185 of the spacer frame 172 and the middle leg 48 of the side 185 of the spacer frame 174 is 0.34 inch. The adjacent sides of the spacer frames 172 and 174 have an offset of 1.13, determined by dividing the distance between the middle leg 48 of adjacent sides of the spacer frames 172 and 174 by 0.30 inches (the height of the spacer frames and the value "b" as shown in FIG. 9.

Shown in FIG. 15 is a sectional view showing marginal edge portion 194 of the triple glazed unit 170 of the invention mounted in a groove 196 of a non-limited embodiment of a sash member 198 of the invention. The sash member 198 can be made of any material, e.g. but not limited to wood, metal, plastic and combinations thereof.

Figure 16A:
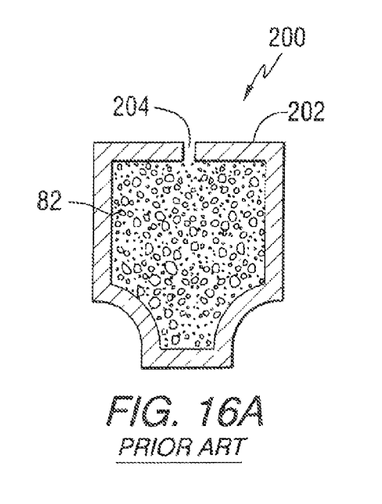
FIGS. 16A and 16B are cross sections of spacer frames that can be used in the practice of the invention.
Figure 16B:
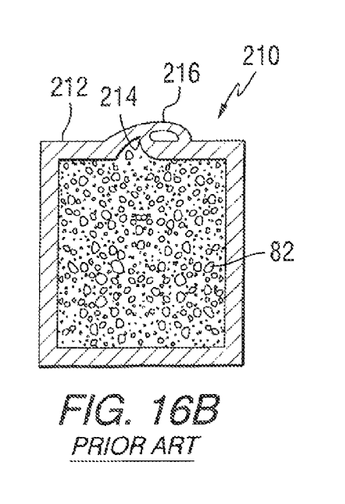

As can now be appreciated, the invention is not limited to the design of the spacer frames discussed above and spacer frames of any design can be used in the practice of the invention. For example, and not limiting to the discussion, spacer frames having the cross section of the type shown in FIGS. 16A and 16B can be used in the practice of the invention. Shown in FIG. 16A is across section of a spacer frame 200 having a hollow plastic or metal body 202 containing the desiccant 82. Moisture access to the desiccant 82 is provided by passageway 204. Shown in FIG. 16B is a cross section of a spacer frame 210 having a hollow plastic or metal body 212 that can be used in the practice of the invention. Moisture access to the desiccant 82 in the body 212 is through a passageway 214 in lock seam 216 of the body 212 of the spacer frame 210. As can be appreciated by those skilled in the art the desiccant 82 can be loose granulated desiccant 82 as shown in FIGS. 16A and 16B, or can be desiccant 82 in the moisture pervious adhesive 84 as shown in FIG. 3.

The invention is not limited to the embodiments of the invention presented and discussed above which are presented for illustration purposes only, and the scope of the invention is only limited by the scope of the following claims and any additional claims that are added to applications having direct or indirect linage to this application.

What is claimed is:

1. An insulating unit comprising:
a first spacer between a first sheet and a second sheet, wherein a first outer surface of the first spacer frame is adhered to inner surface of the first sheet and an opposite second outer surface of the first spacer frame is adhered to a first major surface of the second sheet;
a second spacer frame between the second spacer frame is adhered to a second major surface of the second sheet and an opposite second outer surface of the second spacer frame is adhered to an inner surface of the third sheet, wherein the second major surface of the second sheet is opposite to the first major surface of the second sheet;
wherein the first, the second and the third sheets have similar peripheral configurations and similar peripheral dimensions, and the sheets, the first spacer frame and the second spacer frame have similar peripheral configurations and the peripheral dimensions of the second spacer frame are less than the peripheral dimensions of the sheets and the first spacer frame to provide a peripheral groove defined by a portion the second major surface of the second sheet, a portion of the inner surface of the third sheet and the outer peripheral surface of the second spacer frame to provide a segment of the first spacer frame aligned with a segment of the second spacer frame, and the segment of the first spacer frame and the segment of the second spacer frame have a width and length offset greater than zero.

2. The insulating unit according to claim 1, wherein:
the first spacer frame comprises a first side, a second side opposite to the first side of the first spacer frame, a third side between the first and the second sides of the first spacer frame, and a fourth side opposite to the third side of the first spacer frame, and
the second spacer frame comprises a first side, a second side opposite to the first side of the second spacer frame, a third side between the first and the second sides of the second spacer frame, and a fourth side opposite to the third side of the second spacer frame, wherein the third side of the second spacer frame and the segment of the second spacer frame;
wherein the segment of the first spacer frame is the first side of the first spacer frame and the segment of the second spacer frame is the first side of the second spacer frame.

3. The insulating unit according to claim 2 wherein the segment of the first spacer frame is the first and the second sides of the first spacer frame and the segment of the second spacer frame is the first and the second sides of the second spacer frame.

4. The insulating unit according to claim 3 wherein the segment of the first spacer frame is the first, the second and the third sides of the first spacer frame, and the segment of the second spacer frame is the first, the second and the third sides of the second spacer frame.

5. The insulating unit according to claim 4 wherein the segment of the first spacer frame is the first, the second, the third and the fourth sides of the first spacer frame, and the segment of the second spacer frame is the first, the second, the third and the fourth sides of the second spacer frame.

6. The insulating unit according to claim 5 wherein the offset is equal to or greater than ½.

7. The insulating unit according to claim 5 wherein each of the three sheets have a first side, a second side opposite to the first side, a third side between the first and the second sides and a fourth side opposite to the third side, wherein the length of the first, second, third and fourth sides of the first and the second sheets are greater than the length of the first, second, third and fourth sides, respectively, of the third sheet, and the length of the first, the second, the third and the fourth sides of the first spacer frame are greater than the length of the first, the second, the third and the fourth sides, respectively of the second spacer frame.

8. The insulating unit according to claim 7, wherein the length of the first, the second, the third and the fourth sides of the first sheet and the length of the first, the second, the third and the fourth sides, respectively of the second sheet are equal to one another.

9. The insulating unit according to claim 8 wherein the first spacer frame in cross section comprises a first upright leg, a spaced second upright leg and a base member connecting the first and the second upright legs of the first spacer frame, wherein the first leg has an inner surface and an opposite outer surface, and the outer surface of the first upright leg of the first spacer frame is the first outer surface of the first spacer frame, and the second leg has an inner surface and an opposite outer surface, and the outer surface of the second upright leg of the first spacer frame is the second outer surface of the first spacer frame.

10. The insulating unit according to claim 9 wherein the first spacer frame in cross section has a U-shape and ends of the first leg and of the second leg of the first spacer frame are spaced from and out of contact with one another.

11. The insulating unit according to claim 7, wherein material of the first, second and third sheets is selected from the group soda-lime-silica glass, borosilicate glass, plastic, metal, wood, coated glass and coated plastic and combinations thereof.

12. The insulating unit according to claim 7 wherein the material of the first and the second spacer frame is selected from the group of metal and plastic and combinations thereof.

13. The insulating unit according to claim 1, wherein the first spacer frame and the second spacer frame are adhered to their respective ones of the sheets by a material selected from the group of an adhesive, a sealant, an adhesive sealant, a moisture impervious adhesive, a moisture impervious sealant, and a moisture impervious adhesive sealant.

14. The insulating unit according to claim 1 wherein the first spacer frame in cross section comprises a first upright leg, a spaced second upright leg and a base member connecting the first and the second upright legs of the first spacer frame, wherein the first leg has an inner surface and an opposite outer surface, and the outer surface of the first upright leg of the first spacer frame is the first outer surface of the first spacer frame, and the second leg has an inner surface and an opposite outer surface, and the outer surface of the second upright leg of the first spacer frame is the second outer surface of the first spacer frame.

15. The insulating unit according to claim 14 wherein the first spacer frame in cross section has a U-shape and ends of the first leg and of the second leg of the first spacer frame are spaced from and out of contact with one another.

16. The insulating unit according to claim 1, comprising a filler material in the peripheral groove between the second and third sheets.

\* \* \* \* \*